United States Patent [19]

Kuhnlein et al.

[11] 4,138,309
[45] Feb. 6, 1979

[54] MULTI-STAGE APPARATUS FOR CONCENTRATING SULPHURIC ACID

[75] Inventors: Hans L. Kühnlein, Fuellinsdorf, Switzerland; Wolfgang-Dieter Müller, Leverkusen, Fed. Rep. of Germany

[73] Assignees: Hch. Bertrams Aktiengesellschaft, Basel, Switzerland; Bayer Aktiengesellschaft, Leverkusen, Fed. Rep. of Germany

[21] Appl. No.: 802,102

[22] Filed: May 31, 1977

[30] Foreign Application Priority Data

Jun. 18, 1976 [CH] Switzerland .................... 7807/76

[51] Int. Cl.$^2$ .............................................. B01D 1/22
[52] U.S. Cl. ..................................... 159/13 A; 159/49; 159/24 A; 159/24 R; 159/28 R; 202/235; 202/236; 159/DIG. 15; 159/DIG. 19; 423/531; 203/12
[58] Field of Search ............... 159/13 R, 13 A, 27 R, 159/27 B, 24 R, 24 P, 28 R, 4 K, 42 M, DIG. 15, DIG. 19, 49; 202/233, 234, 235, 236; 203/25, 27, 12; 423/531

[56] References Cited

U.S. PATENT DOCUMENTS

| | | | |
|---|---|---|---|
| 2,590,303 | 3/1952 | Fladmark | 159/24 R |
| 2,758,061 | 8/1956 | Geller | 159/13 A |
| 2,947,689 | 8/1960 | Cain | 159/24 R |
| 3,933,575 | 1/1976 | Guth et al. | 159/DIG. 15 |

*Primary Examiner*—Norman Yudkoff

*Attorney, Agent, or Firm*—Sprung, Felfe, Horn, Lynch & Kramer

[57] ABSTRACT

A multi-stage apparatus suited for concentrating sulphuric acid comprising at least one high temperature stage and one low temperature stage, the high temperature stage including a surrounding wall defining a flue gas channel, means for delivering hot flue gas to said channel, and means for withdrawing from said channel cooled flue gas, the flue gas heating said surrounding wall which in turn imparts heat to material to be heated thereby, the low temperature stage including a heat exchanger with a first flow path for a heating agent and a second flow path for a material to be heated thereby, means for supplying the said second flow path material to be heated, means for withdrawing from said second flow path material after having been heated therein, and means for withdrawing from said first flow path spent heating agent, the means for withdrawing cooled flue gas from said flue channel of said high temperature stage forwarding heat from said cooled flue gas to said first flow path of said low temperature stage to serve as the heating agent in said low temperature stage. Advantageously the high temperature stage involves transfer of radiant energy from a surface heated by hot flue gas to a falling film of sulphuric acid flowing down a quartz tube separated from the radiating surface by an air space. An intermediate heating stage may be provided in which the cooled flue gas heats an exchanger liquid which is the heating medium in the low temperature stage.

5 Claims, 1 Drawing Figure

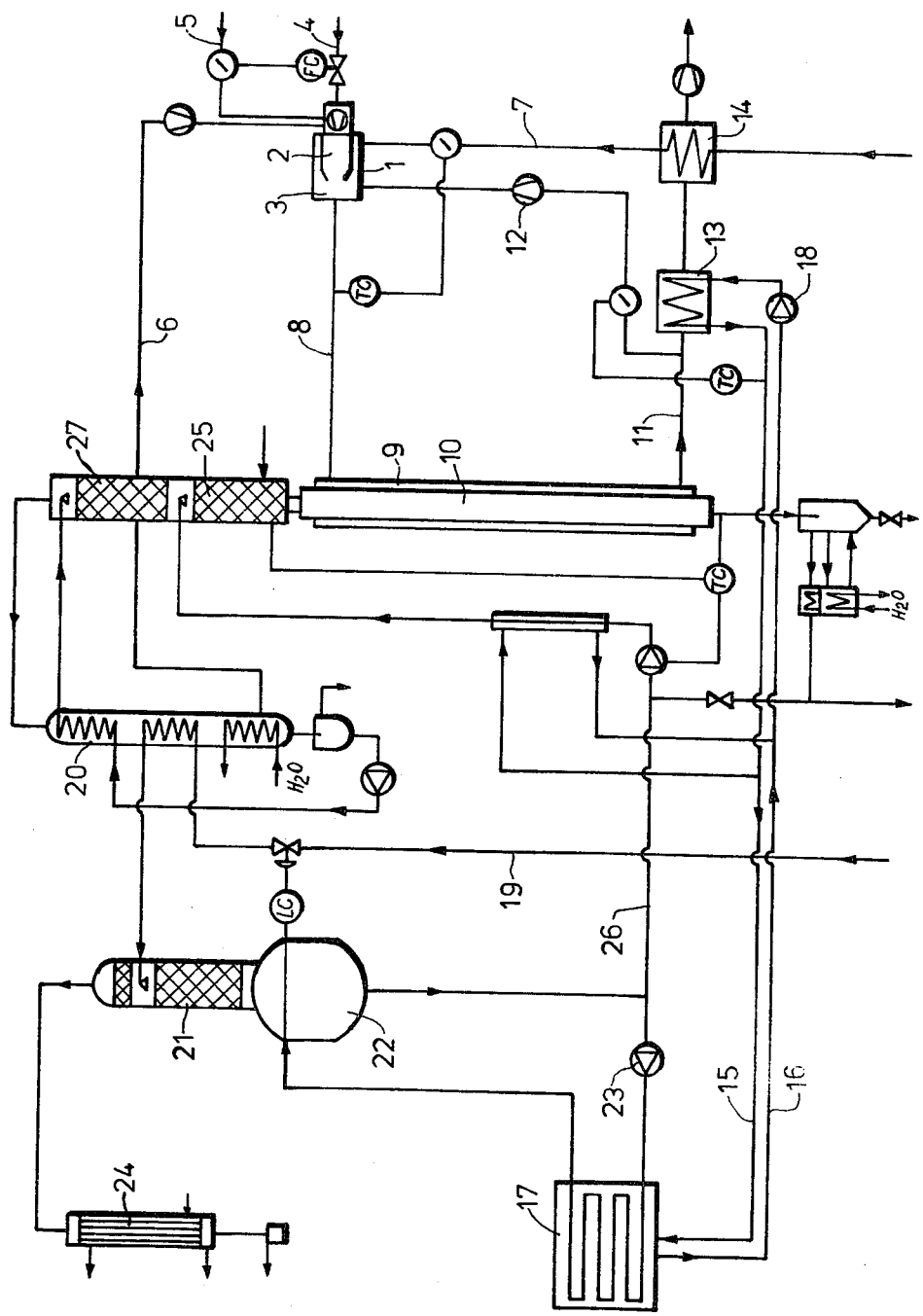

MULTI-STAGE APPARATUS FOR CONCENTRATING SULPHURIC ACID

The subject of the invention is a heat-operated installation with indirect heat transfer, which consists of at least two operational stages working within differing ranges of temperature. Particular problems with such installations are caused by the heat-transferring stages working in the higher ranges of temperature.

For indirect heat transfer in higher ranges of temperature organic heat-transferring means are used up to approximately 400° C., whereas melted salts in eutectic mixtures are known as heat-transferring agents for temperatures up to approximately 550° C. In even higher temperature ranges up to approximately 650° C. liquid metals are often used as heat-transferring agents. The use of liquid metals alone involves high costs, for example in their use in nuclear technology for the cooling of plutonium reactors. This costly technological process, which is necessary in the case of liquid metals, is almost beyond feasibility for use in industrial engineering. In practice therefore electric radiation heating is used within these high temperature ranges; the energy costs for these are however high. Often, in the case of higher temperatures direct heat is used by means of fire gas radiation, as for example in the known Pauling process for forming high concentrations of sulfuric acids in the range of 70% to 96% $H_2SO_4$. The direct fire gas heating forms usually have the disadvantage of an irregular heat transfer, the danger of over-heating due to direct flame jets, as well as a low degree of efficiency in firing because the flue gases leave the system at high temperatures so their heating value cannot be utilized to the full.

The purpose of the present invention is therefore to provide an installation of the kind mentioned hereinabove, which on the one hand avoids a costly technological process in the high temperature range and which allows a particularly high degree of heating efficiency to be achieved. For this purpose the installation according to the invention is characterized in that the heat transfer surfaces in the high temperature range form one surrounding wall of a flue gas channel, the inlet to which is connected to a combustion device, whereas the outlet of the flue gas channel is connected to one flow route of a heat exchanger, whose other flow route contains a liquid heat-transferring agent serving to heat the heat transfer surfaces of the low temperature range.

It can thus be seen that the flue gas used for the heating of the high temperature range is able to transfer a large amount of the heat which it still has when leaving this stage to the liquid heat-transferring agent in the heat-exchanger; this agent in its turn heats the lower temperature stage. The constructional costs for the high temperature stage as heated by flue gas is considerably lower than with the conventionally used liquid heat-transferring agents, whereas on the other hand, by means of the connected heat exchange with a liquid heat transferring agent a high overall efficiency can be achieved for the utilization of the fuel fed into the combustion device. Preferably is the heat-transfer surface of the high temperature stage a heat-radiation surface.

A particularly advantageous illustrative embodiment is described in the drawing, which is a flow sheet of an installation for forming concentrations of sulfuric acid up to the azeotropic level of over 98% $H_2SO_4$, the starting concentrations of the sulfuric acid being between 30% and 70%.

In the drawing 1 is a heating device with combustion chamber 2 and mixing chamber 3. Heating oil or heating gas is led into the heating device 1 via inlet 4 and air via inlet 5. Furthermore uncondensed gases originating from the concentration process can be recycled via inlet 6 or pre-warmed air can be led into the mixing chamber 3 via inlet 7 in order to adjust the temperature of the hot flue gases from the heating device to a desired level. An inlet 8 supplying the flue gases is connected to the inlet of a heating jacket 9, which coaxially encloses an evaporating tube 10 of a high temperature process stage which is here presented in the form of a falling film evaporator. The blowing means used for blowing the combustion air to the heating device 1 can serve to produce the necessary high flowing speed of the flue gases through the heating jacket 9. It is however also possible to tap flue gases from the outlet 11 of the heating jacket 9 and to lead them via a blowing device 12 to produce high speeds in the circuit.

In order to increase the transport of heat and the heat transfer coefficients it is also possible to operate the whole flue gas system under pressure by conducting the combustion of the heating medium in an appropriate pressure chamber. The excess pressure is then lowered to atmospheric pressure by means of a valve at the point where the cooled gases leave to enter the flue gas chimney.

The flue gas pipe 11 leads to the flue gas chimney via a heat exchanger 13 and then via a device 14 for pre-heating the air flowing through pipe 7. In the heat-exchanger 13 the flue gases can transfer heat to a liquid heat-transferring agent, for example an organic heat-transferring oil; the pipes 15, and 16 for the heat-transferring agents connect the heat-exchanger 13 with the low-temperature process stage, also in the form of a heat-exchanger 17. A pump 18 in the reflux pipe 16 serves to further the circulation of the heat-transferring oil.

The crude acid is fed into the process via a pipe 19, passes via a condenser 20, serving as pre-heating means, to a stripping column 21 followed by a separator 22, in which the acid which has been heated in the heat-exchanger 17 and kept in forced circulation by means of a pump 23, is relieved; the water vapor originating from this preconcentration is condensed in a condenser 24 and drawn off. Preceding the high temperature process stage a stripping column 25 is connected to the circuit and preconcentrated sulfuric acid of a concentration of, for example, 70% to 85% is passed into this column as it comes from supply line 26. In order to prevent the escape of sulfuric acid vapors a washing column 27 is connected to the circuit which is sprayed with condensate. Then the vapors are condensed in the condenser 20. The uncondensable gases escaping from the system are, as described hereinabove, led into the heating device 1 for combustion and the condensed water separated from the acid can be drawn off as condensate. The condenser 20 is, as mentioned, at the same time used as a preheating device for the crude acid, which can for example flow into the system at concentrations of 30% to 70% and first of all be brought to the desired starting concentration for the final stage in the preconcentration stage under vacuum.

As far as the apparatus for the process is concerned it is advantageous to form preconcentrations of 85% when operating with sulfuric acid; this level of preconcentration can be achieved for example at 80 mm Hg at a boiling temperature of 161° C. At this temperature level apparatus made of enamel can for example be used, so that the heat-exchanger 17 can be nondestructively heated with the low-temperature heat-transferring agent employed at, for example, 250° C. Since contaminations are usually already precipitated in this preconcentration stage, a forced diversion via pump 23 is provided. The evaporation takes place by lowering the surface tension of the liquid in the separator 22, on which a stripping column 21 is also arranged, into which the preheated crude acid is led.

During operation of the described installation average temperatures of 800° C. and more can be employed in the high temperature process stage, by leading flue gases, for example, into the heating jacket 9 at 900° C. and drawing them off at 700° C. By circulating the flue gases it is possible to obtain the temperatures required. After the flue gases have left the high temperature stage they are reduced for example from 700° C. to 300° C. in the heat exchanger 13 depending upon the temperature level desired in the second heating circuit. In the example described the organic heat transferring oil for the heating process in the second circuit is employed at a temperature level of, for exampoe, 250° C. For the purpose of achieving a very high degree of efficiency of the firing process, the flue gases are subsequently cooled in the air-preheating device 14 to up to 150° C., the exact cooling temperature depending upon the dewpoint of the contaminants. The air-preheating device 14 can heat air from the surrounding atmosphere to 280° C., for example, and the whole quantity of heat is in its turn transferred to the heating device 1. The heating system described is, for example in the production of high concentrations, used appropriately when the final stage, the production of high concentrations of up to 98%, is to be operated under the highest possible temperatures, because by doing this oxidation can be effected of, for example, organic contaminants in sulfuric acid solutions which are to be worked up. The so-called high concentration stage is suitably operated with a quartz falling film evaporator tube 10 which is heated by means of a metal radiation jacket 9 separated from the tube by an air-filled radiation space. This metal radiation jacket can, because of the hot flue gases, be heated to a temperature in excess of 800° C. to attain the necessary operational temperatures.

The described two-stage installation allows if necessary a fractionated expulsion of harmful substances, for example, from an acid contaminated in varying ways. The installation can be arranged in such a way that the greater part of the harmful substances can be expelled in the preconcentration stage, which is of course dependent on the boiling behavior of the contaminants.

It will be appreciated that the instant specification and examples are set forth by way of illustration and not limitation, and that various modifications and changes may be made without departing from the spirit and scope of the present invention.

What is claimed is:

1. A multi-stage heat-operated apparatus comprising at least one high temperature stage and one low temperature stage, the high temperature stage including a surrounding wall defining a flue gas channel, means for delivering hot flue gas to said channel, and means for withdrawing from said channel cooled flue gas, the flue gas heating said surrounding wall which in turn imparts heat to material to be heated thereby in the high temperature stage, the high temperature stage including a first heat exchanger for transferring heat from the cooled flue gas to a heating agent, a second heat exchanger for transferring heat from the heating agent to the low temperature stage, the first and second heat exchangers forming a closed loop through which the heating agent is cycled, the heating agent picking up heat in the first exchanger and giving up heat in the second exchanger, means for withdrawing from said first heat exchanger spent flue gas, and means for delivering material heated in said second heat exchanger to said high temperature stage so as to be operated upon therein.

2. An apparatus according to claim 1, wherein the heat transfer surface of the surrounding wall of the high-temperature stage is a heat-radiation surface.

3. An apparatus according to claim 1, wherein the high temperature stage further includes a quartz tube, means for supplying a falling film of liquid to one surface of said tube, and means for withdrawing liquid adjacent the lower end of said tube, the quartz tube being spaced from said surrounding wall, the falling film and the flue gas respectively contacting the surfaces of said tube and wall which are more remote from one another.

4. An apparatus according to claim 1, including a pressure combustion chamber wherein said flue gas is formed by combustion under pressure, said means for delivering said flue gas to said flue gas channel from said combustion chamber operating under pressure.

5. A process for concentrating an aqueous sulfuric acid solution comprising heating a radiating surface to a high temperature with a flue gas, passing a film of preconcentrated sulfuric acid solution over another surface spaced from the radiating surface so that said film receives radiant energy to evaporate water from said solution to form a more concentrated solution and cooled flue gas, heating a heat transfer agent with said cooled flue gas, and effecting preconcentration of said aqueous sulfuric acid solution by heat exchange with said heat transfer agent.

* * * * *